United States Patent Office 3,764,324

Patented Oct. 9, 1973

3,764,324

PHOTOGRAPHIC POLYMER COMPOSITION AND PROCESS FOR CROSSLINKING

Zoila Reyes, Menlo Park, Calif., assignor to McCall Corporation, New York, N.Y.

No Drawing. Continuation-in-part of abandoned application Ser. No. 886,767, Dec. 19, 1969. This application Apr. 13, 1972, Ser. No. 243,845

Int. Cl. G03c *1/70*

U.S. Cl. 96—35.1 26 Claims

ABSTRACT OF THE DISCLOSURE

A relief image element useful as a printing plate is prepared by the selective exposure of a mixture comprising an unsaturated elastopolymeric composition, a saturated halogenated polymer and a crosslinking agent to UV light or high energy radiation in the presence of a photoinitiator. The resulting product is a relatively hard, resilient three dimensional polymer system which is resistant to printing ink solvents.

This application is a continuation-in-part of Ser. No. 886,767 filed Dec. 19, 1969, now abandoned.

The present invention relates to photoinitiated polymer crosslinking reactions and more particularly to an improved composition and process for crosslinking an elastopolymer and a halogenated polymer to provide an improved product such as a resilient, abrasion resistant relief printing plate.

The use of photopolymerizable materials to prepare relief image elements suitable for use as printing plates is known in the art. In the typical prior art process an ethylenically unsaturated monomer is admixed with appropriate solvents and photoinitiators to form a liquid layer on a base plate. The layer is then selectively exposed to light to polymerize the exposed area and an image is subsequently developed by selectively dissolving the unexposed, unpolymerized areas of the layer. In order to increase the insolubility of the polymerized areas, some photo-polymerizable compositions in the prior art have included crosslinking agents, normally addition polymerizable materials having a plurality of ethylenic groups within their structure.

While the above described processes and compositions are capable of producing relief images, they are not entirely satisfactory in several important respects. For example, uniform quality structures are not readily produced from such methods in view of the difficulty in controlling the extent of polymerization. Moreover, the starting monomeric materials are often volatile liquids which increases the difficulty of producing uniform layers and uniform images. Attempts have been made to overcome this problem by the addition of polymers or other viscosity increasing agents to the polymerizable layer. However, these additions increase the cost of the product. In addition, the polymer systems heretofore employed have not had a high degree of light sensitivity and have therefore required longer exposure times which also contribute to higher cost. A further difficulty with the polymerizable systems heretofore employed to produce relief images is that they have not offered the mechanical and chemical properties required for printing plates. In some instances the images have had in sufficient oxidation resistance while in other instances the resistance to conventional printing ink solvents was unsatsifactory. Moreover, the toughness, flexibility, durability, abrasion resistance and shock resistance requirements for a printing plate have not been satisfied. The polymers produced are often unyielding and brittle resulting in breakage.

It is an object of the present invention to provide a novel low cost composition and method for the production of relief images.

It is another object of the invention to provide a novel polymer composition having a high degree of light sensitivity which results in the rapid production of relief images.

Yet another object of the invention is the production of relief images having improved mechanical and chemical properties.

The above and other objects of the invention are accomplished by a novel composition and method in which selected unsaturated elastopolymers are reacted with a halogenated polymer and a bifunctional crosslinking agent by exposure to light or high energy radiation in the presence of a photoinitiator. It has now been discovered that by the pre-selection of particular polymer systems, rather than in situ polymerization, a high degree of control over both processing techniques and the characteristics of the reaction product can be achieved in a photo-initiated crosslinking reaction. Moreover, by the inclusion of a photosensitive polymer, e.g. a halogenated polymer, in the reaction system a highly sensitive rapid crosslinking reaction is achieved in which the elastopolymer is not only crosslinked with the bifunctional crosslinking agent but also with the halogenated polymer thereby resulting in a novel three dimensional system possessing the requisite physical and chemical properties required for the formation of relief images suitable for use in printing plates. It is a further feature of the invention that the physical properties and solvent resistance of relief images formed from the composition of the invention may be further controlled by the addition of various hardening agents and the like.

Although the above described reaction may be carried out with a wide variety of crosslinking agents, the present invention also contemplates the use of a novel class of crosslinking agents namely di- and polyfunctional monomeric salts of unsaturated mono and polycarboxylic acids with unsaturated amines. It has been discovered that these materials further increase the sensitivity of the crosslinking reaction and in addition enhance the solubility and rate of solution of the non-crosslinked portion of the polymer system subsequent to the crosslinking reaction. It has also been discovered that by using selected combinations of two or more crosslinking agents a high degree of control over the physical properties of the relief images formed from the compositions of the invention can be obtained.

In the preparation of printing plates, the composition including the elastopolymer, halogenated polymer, photoinitiator and crosslinking agent is applied to a base in one or more layers, depending upon the end use of the plate, and exposed to ultraviolet light through a process transparency. Exposure may also be "line by line" by electron radiation to effect crosslinking of the elastopolymer in the irradiated portions. In the areas struck by light or the electron beam, the elastomer is crosslinked with the remaining or unexposed portions of the plate being removed by a solvent to provide a relief image plate. This plate may be used directly on a press, such as a letter press, or may be used as a flexographic plate. The relief image plate may also be used as a master to prepare an intaglio intermediate for the preparation of electrotypes or stereotypes. By suitable formulation and processing, as will be apparent to those skilled in the art, gravure and wraparound plates can be directly prepared by the present invention. The composition is such that it may also be used in the preparation of etched plates or as a coating for preparation of planographic plates particularly of the so-called "deep-etch" type.

Those skilled in the art will readily appreciate that the compositions, process and features of this invention have utility in areas other than in printing plate preparation, although for purposes of explanation, the invention will be described in connection with the preparation of such plates.

The elastopolymers which are crosslinked, in accordance with the present invention, are those containing a multiplicity of internal ethylenic groups in a non-aromatic structure. In the photoinitiated crosslinking reaction at least a portion of the available ethylenic bonds are opened to effect crosslinking between polymer chains. It has been found that the utilization of a copolymer derived from monomeric butadiene or butadiene derivatives and monomeric acrylonitrile or acrylonitrile derivatives is critical to obtaining a reaction product having the requisite properties for use in printing plates.

Typical butadiene monomers which may be employed either alone or in combination to form the copolymer include butadiene; isoprene, chloroprene, piperylene and 2,3-dimethylbutadiene. Examples of acrylonitrile monomers include acrylonitrile, its methyl and ethyl derivatives and derivatives such as 2-hydroxyethyl-, 2-hydroxymethyl- α-acetoxy-, and β-phenylacrylonitrile; vinylidene cyanide, cinamomonitrile; fumaronitrile; maleonitrile; and benzylidenemalonitrile. As a further alternative small amounts of additional monomers such as ethylene, propylene, styrene, acrylic acids or esters and the like may be included so as to form terpolymers including the basic butadiene acrylonitrile copolymer structure.

The preferred elastopolymer composition is a copolymer of acrylonitrile and butadiene having an acrylonitrile content of about 15 wt. percent to 50 wt. percent of the total copolymer. The copolymer may additionally contain carboxyl groups within its structure in order to increase the adhesion of the polymer layer to a base. The formation and structure of carboxylated rubbers is well known to persons skilled in the art and is disclosed for example, in Marvel et al., Ind. Eng. Chem. 47, 344 (1955); Brown et al., Rubber Chem. and Technol. 28, 937 (1955); and Carlson U.S. Pat. No. 2,726,230.

The novel polymer compositions of the present invention are characterized by the inclusion of a saturated halogenated polymer as an essential ingredient of the reaction mixture. Particularly preferred polymers include polyvinylchloride or copolymers thereof containing minor amounts, e.g. 10–20 wt. percent, vinyl acetate. However, other halogenated polymer systems such as vinylidene halides, polyvinyl fluorides and copolymers of these materials may also be employed. While not wishing to be limited to a particular theory, it is presently believed that the presence of a halogenated polymer in the reaction mixture catalyzes the overall crosslinking reaction by breaking down in the presence of light or high energy radiation thereby releasing hydrogen halides and creating free radicals which rapidly enter into crosslinking reactions with the other polymers and monomers present in the system.

The polymer systems of the invention may be further modified, if desired, by the inclusion of selected hardening agents to control the final physical characteristics of the system. The preferred hardening agents are thermosetting resins such as polyvinyl formal, polyvinylbutyral, maleic acid polyesters, and preferably isophthalic acid-maleic acid polyester resins such as those available from Diamond Shamrock Chemical Co. under the trademark "Dion Iso" resins.

It is a further feature of the present invention to empoly a novel class of crosslinking agents which are nonvolatile, inexpensive and enhance the solubility of the non-crosslinked polymer after exposure to light. The novel crosslinking agents are di- or polyfunctional monomeric salts of unsaturated mono, di- or polycarboxylic acids or their amino esters with unsaturated tertiary amines. Typical acids include acrylic, methacrylic, fumaric, cinnamic, oleic, maleic, mesaconic, citraconic, trans- and cis-glutaconic, itaconic, muconic, and cis- and trans-aconitic, although acrylic, methacrylic, fumaric and maleic are preferred because of their availability. The unsaturated amines include vinyl pyridines such as 2-vinyl or 4-vinyl pyridine; acrylic or methacrylic esters of dimethylaminoethanol, diethylamino ethanol or tributylamino ethanol such as dimethylaminoethyl acrylate (DMAEA), diethylaminoethyl acrylate, tributylaminoethyl acrylate. Examples of the novel salts are DMAEA maleate, acrylic acid salt of 4-vinyl pyridine.

The number of ethylenic bonds crosslinked depends on the amount of internal unsaturation in the copolymer and the desired hardness of the resulting product. By way of example, for resilient abrasion resistant products obtained from an acrylonitrile-butadiene copolymer, crosslinking of about 10% to 15% of the available ethylenic groups is sufficient. Above this amount, the crosslinked polymer becomes increasingly hard although it is still useful as the top printing surface of a relief plate or in other applications where harder polymeric materials are needed. Below this level, the polymer may not be sufficiently crosslinked to be resistant to the solvents used in printing inks, but if resistant to such solvents, the crosslinked polymer is quite satisfactory as an intermediate coating in a relief plate to provide an internal "cushion" in the plate or a resilient outer printing surface.

The properties of the crosslinked polymer systems of the invention can be further controlled by the addition of a select group of bifunctional monomers as a second crosslinking agent. The particular crosslinking agents which have been found to be useful in the system are the reaction product of an aliphatic or aromatic di-isocyanate with a compound having a reactive hydroxyl group and particularly mono-acrylic or methacryl esters of di- or polyhydroxy compounds. Typical di-isocyanates which may be employed to form the bifunctional monomer as tolylene-2,4-diisocyanate (TDI) and methylene bis-4,4′-phenylene diisocyanate. Typical hydroxy compounds include hydroxyethyl methacrylate (HEM), hydroxymethyl acrylate and similar compounds. The reaction product of TDI and HEM is tolylene-2,4-di (2-methacryloyl) ethyl carbamate (TDMEC) and is a preferred second cross-linking agent for the polymer system. While not wishing to be limited to a particular theory, it is presently believed that these bifunctional monomers react with the other cross-linking agent in the system, as well as the polymeric materials, thereby increasing the density of the cross-links in the reaction product and producing relief images with increased hardness and exceptional resistance to both the solvents employed to develop the image and to printing ink solvents.

The amounts of the aforementioned polymeric and monomeric materials which are used to form the systems of the invention are not critical and wide variations in formulation are possible depending upon the desired properties of the final composition. For example the amount of elastopolymer and saturated halogenated polymer may vary from as little as 10 wt. percent of the composition to 70 wt. percent or more. The amount of cross-linking agent can also vary widely, e.g. from 5 to 25 wt. percent of the mixture. As previously noted, the use of an additional hardening agent or second cross-linking is optional and the amount of each may vary from 0 to 30 wt. percent or more of the composition.

The crosslinkable mixture including the elastomeric copolymer, halogenated polymer hardening agent, if any, and crosslinking agent or agents will also contain a photoinitiator. The photoinitiators may be any one or a combination of the following materials, depending upon the type of radiation used:

(a) Vicinal ketaldonyl compounds, such as diacetyl and benzil;

(b) Alphaketaldonyl alcohols, such as benzoin, tolyoin, pivaloin, acyloin ethers such as benzoin methyl or ethyl ethers; alphahydrocarbon substituted aromatic acyloins such as alpha-methyl; alpha-allyl and alphaphenylbenzoin;

(c) Benzophenone, acetophenone, benzalacetophenone, and paradimethylaminophenyl ketone; and (d) Polynuclear quinones such as 9,10-anthroquinone, 1-chloroanthroquinone, 2-chloroanthroquinone, 2-methylanthroquinone, 2-tera-butylanthroquinone, octamethyl-anthroquinone, 1,4-naphthaquinone, 1,2-benzathroquinone, 2,3 - benzanthroquinone, 2-methyl-1, 4-naphthaquinone, 2,3 - dichloronaphthaquinone, 1,4-dimethylanthroquinone, 2-3 - dimethylanthroquinone, 2-phenylanthroquinone, 3-chloro-2-methylanthroquinone, retenequinone, 7, 8, 9, 10-tetrahydronaphthacenequinone and 1,2,3,4-tetrahydrobenzene (a) anthracene-7,12-dione.

In the case of materials to be crosslinked by electron irradiation, it has been found in accordance with this invention that photoinitiators such as thioketones, e.g., thioanalogs of benzil, benzophenone, acetophenone, benzilacetophenone and dimethylaminobenzophenone may be used and offer the advantage of preventing the scattered radiation from crosslinking adjacent image areas.

The photoinitiator may be present in an amount ranging from .01 to 25%, preferably .01 to 6%, based on the weight of the elastopolymer and varies with the thickness of the layer. At the higher percentage range, the crosslinkable elastomer composition is more sensitive to radiation and the crosslinking reaction is "triggered" in a shorter time. In the case of multiple coatings, varying the percentage of photoinitiator from one coating to the next compensates for the attenuation of radiation through the thickness of the coating.

If desired, thermal initiators may be used, for example, the peroxides usually used for free radical addition polymerization, such as benzoyl peroxide, tertiary-butyl hydroperoxide, acetyl benzoyl peroxide, tertiary butyl peroxide benzoate, ditertiary-butyl peroxide, and the like.

In some instances it may be desirable to utilize a small amount of thermal polymerization inhibitor in order to prevent the crosslinking reaction from taking place due to heat which may be generated through the process transparency or due to low extraneous amounts of "non-image" radiation. Suitable crosslinking inhibitors include p-methoxyphenol, hydroquinone, alkyl and aryl-substituted hydroquinones, tert-butyl catechol, pyrogallol, naphthylamines, betanaphthol, 2,6 - di-tert-butyl-p-cresol, phenothiazine, 4 - (methyl thio)-phenol, 4 - (methyl thio)-m-cresol, nitrobenzene, dinitrobenzene, chloroanil, and thiazine dyes, for example, Methylene Blue B.

The crosslinkable polymer mixture may also include a non-extractable compatible plasticizer particularly of the glycol type such as polypropylene glycol of molecular weight between 1000 and 3000, a polyethylene glycol of molecular weight between 400 and 4000. Other compatible plasticizers may be used as is apparent to one skilled in the art. In addition, fillers may be added to the elastopolymer mixture provided they are of the clear, transparent variety so as not to reduce significantly the transparent nature of the elastopolymer mixture. Typical such transparent fillers or reinforcing agents are powdered glass, silica, bentonites, organophilic silicas of particle size less than about 18 mesh (U.S. Standard), calcium, magnesium or aluminum stearate. Dyes and color forming materials may be used in the crosslinkable mixture but should not absorb appreciable amounts of radiation in the wavelength of exposure, or inhibit the crosslinking reaction.

In the preparation of relief images, the crosslinkable polymer mixture is applied to a suitable base such as aluminum, stainless steel, steel, or other metal plates, or a plastic substrate such as polyethylene terephthalate, nylon, molded or cast polyurethane and the like. For other applications suitable bases may be cellulosic materials such as paper, fibers of the woven or non-woven type, and various metals and plastics in addition to those previously mentioned.

Where highly reflective substrates are used, such as polished aluminum, copper or steel, a suitable anti-halation primer coat may be applied between the substrate and the crosslinkage polymer mixture to form a light absorbing stratum. Suitable light absorbing layers may be formed by dying the surface of an anodized aluminum plate, and in the case of steel plates by chemical blackening using molten dichromate baths. The light absorptive stratum may also be formed by a resin coating through which is distributed highly absorptive pigments such as iron oxide or organic dyes. Suitable resins for use as binders for the light absorptive stratum are epoxy resins, i.e. reaction products of epichlorohydrin and bisphenol A. In some instances it may be desirable to use a sub-coating between the metal plate and the polymer mixture. Polyurethane coatings operate satisfactorily, although other coatings may be used.

An organic solvent solution of the crosslinkable polymer mixture may be applied to a suitable base, previously described, by any one of several methods to provide one or more level, even coatings of desired thickness which may range from 1 to 350 mils or more, preferably 25 to 100 mils. For example, the mixture may be applied by a doctor blade, curtain coater-doctor blade, fountain coater, offset or direct coater, flooded nip coater, or an extrusion coater if the mixture is of high viscosity. It may also be molded, laminated, or applied by hand or spraying in those cases where controlled thickness of the coating is not essential. Depending on the end product, the mixture may be applied in a pattern or in the form of a controlled discontinuous pattern, such as printing or a repeating varying varying pattern, and the like. The solvent used is preferably a fast evaporating nonflammable organic solvent such as the chlorinated solvents, e.g., methylene chloride, 1,1,1-trichloroethane, although other solvents may be used such as methyl ethyl ketone, or mixtures of ketones and chlorinated hydrocarbons. The crosslinkable elastopolymer mixture is dissolved in the solvent. After coating, the solvent is eliminated by evaporation or any other known procedure to leave a substantially uniform coating on the base member. The dried coating or pattern may then be exposed to a suitable radiation source.

The dried coating is transparent to the radiation used so that even the lowermost strata of the coating are crosslinked, either directly to the base member or to any subcoating which may be used, i.e., antihalation layer or intermediate adhesion coating. The entire coating or pattern may be crosslinked to form a cured elastomer type coating on a base, or selected portions of the coating may be crosslinked by the use of a stencil or process transparency. The radiation source should provide an effective amount of radiation in the ultraviolet region since the majority of the photoinitiators exhibit maximum sensitivity in that region, i.e., 3000–4000 A. with a peak response in a narrow band. The radiation source may be a point source or a broad source, for example, argon glow lamps, carbon arcs, mercury vapor arc, incandescent lamps with ultraviolet emitting phosphors, and the like. In some instances, it may be desirable to expose the dried coating to visible light using a photoinitiator responsive in the visible region, 4000–7000 A., sensitizing dyes, Eosin/amine. Line by line irradition with an electron beam may also be used with and without sensitizers; the thioketone photoinitiators previously described give good images.

It is a further feature of the invention to control the size and shape of the selectively crosslinked reaction product by the use of multi-layered coatings of the same or different thicknesses. Composite coatings of this type offer the advantages of controlling the shape of the characters of the relief image and assuring that the lowermost layers are crosslinked to the same extent as the outer layers. By providing a plurality of layers, the most sensitive of which is the base layer, a higher degree of crosslinking will occur at the base and pyramidal shaped characters or dots will be formed. For example, an 18 mil thick coating consisting of nine layers of 2 mil thickness each may be formulated so that the bottom three layers contain 5% of photoinitiator, 3% in the middle three coatings and .25% in the three surface coatings, all percentages being based on the weight of the elastopolymer. The number of film layers, the thickness of each layer and the amount of photoinitiator in each layer may be varied to achieve any desired characteristics in the crosslinked product.

Subsequent to the selective exposure of the crosslinkable mixture to the light or radiation source the relief image is developed by selective dissolution of the non-crosslinked portions of the coating. Any of the previously identified organic solvents for the non-crosslinked mixture may be employed by brushing the entire polymer surface with the solvent selected. Typical solvents include methylethyl ketone, butyrolactone, methylene chloride, xylene, a benzene aqueous emulsion and blends such as butyrolactone methanol, butyrolactone-water and xylene methylene chloride. The resulting product is a sharp image corresponding to the stencil or transparency employe during exposure.

It is a further feature of the processing techniques employed in the present invention to control the physical characteristics of the relief image by post radiation processing. Thus, in the event a harder relief image is desired, the developed image may be re-exposed to radiation to cause further crosslinking. Alternatively, small amounts of the previously identified photoinitiators may be brushed on the image surfaces which may then be re-exposed to radiation to cause further surface hardening by increased crosslinking. As a further alternative a surface hardening chemical reaction may be induced by treating the image surfaces with any of a wide variety of compositions which will react with one or more of the functional groups in the crosslinked product.

The following examples are offered as illustrative of the present invention, and are not to be construed as a limitation thereon:

EXAMPLE 1

A crosslinkable polymer mixture was prepared including the following:

3 grams of a 20% solid solution (methyl ethyl ketone) of a carboxylated (between 1% and 20%) acrylonitrile-butadiene compolymer, 3 grams of a 20% solids solution (methyl ethyl ketone) of polyvinyl chloride-vinyl acetate copolymer (13% vinyl acetate), 0.060 gram of a crosslinking agent which was the reaction product of 3,4-epoxy-6-methylcyclohexylmethyl 3,4-epoxy-6 methylcyclohexane carboxylate and arcylic acid (10% based on the acrylonitrile copolymers), 0.065 gram of polypropylene glycol (molecular weight 2025), 0.0012 gram of di-tertiary butyl peroxide, and 0.007 gram of benzophenone (1% of the combined weight of acrylonitrile copolymer and crosslinking agent).

A 2 mil thick coating was formed on a metal base, and the coating was allowed to dry. Six samples were exposed to ultraviolet light from a 250 watt Uviarc lamp through a lettered stencil for periods ranging from ½ to 10 minutes. The exposed plates were treated with methylene chloride, applied with a brush, to remove the unexposed portions. The results were as follows:

| Exposure time (minutes): | Image |
|---|---|
| 0.5 | Some distortion. |
| 1 | Some wrinkling. |
| 2 | Good. |
| 3 | Do. |
| 4, 6, 8, 10 | Excellent. |

EXAMPLE 2

A coating of approximately 18 mils thickness comprised of nine layers, each of two mils thickness, was applied to a metal base member having a polyurethane coating thereon, each layer being applied at 15 minutes intervals. The composite plate was allowed to dry over night at atmospheric pressure and was dried for 4 hours under vacuum at room temperature. The following formulation with methylethyl ketone solvent was used:

36 grams of 20% solids solution carboxylated acrylonitrile-butadiene copolymer;

36 grams of a 20% solids solution of the polyvinyl chloride copolymer of Example 1;

1.08 grams of the crosslinking agent of Example 1 (15% based on acrylonitrile copolymer), 0.77 gram plasticizer of Example 1, and 0.144 gram of di-t-butyl peroxide (1% based on the combined weight of the acrylonitrile copolymer and crosslinking agent), Benzophenone was used as a photoinitiator and in a concentration of 5% of the combined weight of the acrylonitrile copolymer and crosslinking agent in the bottom three coatings, 3% in the middle three coatings, 0.25% in the top three coatings.

Various samples of the coating were exposed through a paper dot stencil for 3, 4, 6 and 8 minutes and the plate was developed with methylene chloride in approximately 5 minutes. Sample plates were also exposed to ultraviolet lights through a black and white negative for periods up to 15 minutes. Pyramidal shaped images were obtained and tested with printing inks and good prints were obtained. The ink transferred well to the relief image and from the relief image to the paper.

In the following examples, the materials of Example 1 were used except where indicated otherwise. The amounts are percentage by weight of the total composition.

EXAMPLE 3

| | Percent |
|---|---|
| Elastopolymer | 47.25 |
| Polyvinyl chloride co-polymer | 47.25 |
| Cross-linking agent | .5 |
| No plasticizer. | |
| Photoinitiator | 0.5 |

Samples exposed to UV light for ½ to 3 minutes produced satisfactory images.

EXAMPLE 4

| | Percent |
|---|---|
| Elastopolymer / Polyvinyl chloride copolymer | 85.50 |
| Cross-linking agent | 7.5 |
| Plasticizer | 6 |
| Photoinitiator | 1.0 |
| Inhibitor (Bianthrone) | 0.001 |

Good images were obtained by exposure of ultraviolet light for periods of 1, 2 and 3 minutes. Good images were also obtained by exposure to electron radiation at a beam current of 40 microamps using a vertical deflection time of 200, 500 and 1000 milliseconds. Samples were also exposed to electron radiation at a beam current of 70 microamps and a vertical deflection time of 200 milliseconds and 80 amps at 100 milliseconds. The electron radiation exposed images were developed in a butyrolactone and methanol mixture.

In the following examples a variety of formulations were prepared and irradiated in order to determine the effect of various cross-linking agents, inhibitors and the like. The compositions and results are presented in tabular form:

| Example | Polymer | Cross-linking agent | Photosensitizer (and plasticizer) | Radiation and results |
|---|---|---|---|---|
| 5 | Elastopolymer of Example 1,43.5% vinyl chloride copolymer of Example 1, 43.5%. | Ethylene glycol diacrylate (EGDA), 6%. | Polypropylene glycol (PPG), 6%, benzophenone (BP), 1%, hydroquinone 0.0001%. | UV, good image in one minute. |
| 6 | Cold polymerized acrylonitrile butadiene with medium high acrylonitrile content and carboxylic groups on polymer chain (28–34% acrylonitrile), 36.2% and vinyl chloride copolymer of Example 1, 36.2% and 8.1% of brominated liquid acrylonitrile butadiene rubber with medium high acrylonitrile content (28–34%). | As per Example 1, 7.5% and maleic acid salt of dimethylaminoethyl methacrylate (DMAEM), 5% | PPG, 6%, BP, 15% | UV, good image in thirty seconds. |
| 7 | Cold polymerized acrylonitrile butadiene with medium high acrylonitrile content and carboxylic groups on polymer chain (28–34% acrylonitrile), 37.0% and vinyl chloride copolymer of Example 1, 37.0%. | Acrylic acid salt of diethylaminoethyl acrylate (DEAEA), 5%. | BBP, 6%, BP, 15% | UV, good image in twenty seconds. |
| 8 | As per Example 7 | DMAEM, 5% | PPG, 6%, BP, 15% | Do. |
| 9 | do | Acrylic acid salt of DEAEA, 5%. | PPG, 6%, BP, 15% | Do. |
| 10 | do | Methacrylic acid salt of DEAEA, 5%. | PPG, 6%, BP, 15% | Do. |
| 11 | do | Acrylic acid salt of 4-vinyl pyridine, 5%. | PPG, 6%, BP, 15% | Do. |
| 12 | do | Acrylic acid salt of DMEAM, 5%. | PPG, 6%, BP, 15% | Do. |
| 13 | do | Cinnamic acid salt of DEAEA, 5%. | PPG, 6%, BP, 15% | Do. |
| 14 | do | Oleic acid salt of DEAEA, 5% | PPG, 6%, BP, 15% | Do. |
| 15 | Materials as per Example 7 but present as follows: 40.25%/40.25% for bottom ½, 42.25%/42.25% for top ½ | Acrylic acid salt of DEAEA, 7.5%. | PPG, 6%, BP, 6% for bottom ½, 1.5% for top ½; hydroquinone, .001% for bottom ½, .01% for top ½. | UV, good image with four minute exposure through a negative. |
| 16 | As per Example 7 | Methacrylic acid salt of DEAEA, 7.5%. | As per Example 15 | As per Example 21 but six minute exposure. |
| 17 | Materials as per Example 7 but present in amounts of 39.5% each. | Acrylic acid salt of dimethylaminoethyl methacrylate, 10%. | PPG, 6%; BP, 5%; hydroquinone, .01%. | UV, good image with one minute exposure through a negative. |

EXAMPLE 18

A coating 30 mil thick was cast on acid etched steel from a 20% (solids) solution of the following ingredients in a mixture of 63% methylene chloride, 15% α-trichloroethane, 15% β-trichloroethane, and 7% toluene:

| | Parts |
|---|---|
| Acryonitrile-butadiene copolymer | 15 |
| Polyvinyl chloride | 42 |
| Isophthalic maleic acid polyester (dion-iso) resin | 15 |
| TDMEC | 15 |
| DMAEM | 10 |
| Benzophenone | 2.4 |
| Dow Corning #6 (leveling agent) | 0.6 |

The resulting plate was exposed for 4 minutes in a vacuum frame through a combined half tone/line negative. The UV source was a bank of 11 fluorescent tubes (Sylvania F 20 T 12–BL). The image was developed by spraying for 7 minutes with a 9:1 mixture of trichloroethane: methyl ethyl ketone at 120 lb. pressure in a spray developing machine. An excellent image with a relief depth of 25 mil resulted.

The compositions and processes of the present invention may be used to provide improved elastomeric products cross-linkable by radiation, e.g., particularly printing reliefs used in all types of printing, but especially those types of printing in which the printing and non-printing areas are at different heights. Line or half-tone relief plates may be prepared, or combinations of line and half-tones. Additionally, the present invention offers the advantage of being able to structure the relief image by providing a multilayered plate with varying percentages of photoinitiator and/or crosslinking agents so that the relief image is generally pyramidal in shape to add strength. Since the relief image is resilient and abrasion resistant, it may be used as an intaglio plate wherein the ink is applied by a doctor blade.

The relief plates of this invention also offer the advantage of reducing make-ready time. Plates prepared in accordance with the present invention have been tested on printing presses and have exhibited extremely long life, for example, 4 million impressions. The advantage of plates having a long press life is elimination of costly down-time needed in the replacement and realignment of plates during the so-called long run types of printing operations. This is particularly true in multi-color printing wherein 4 or 5 plates must be precisely registered, and failure of one plate necessitates stopping the presses and going through the entire make-ready procedure which may be as long as 5 or 6 hours depending upon the type press.

By suitable exposure processing known to those skilled in the art flat as well as wraparound and flexographic plates may be prepared.

While the products and processes herein described constitute preferred embodiments of the invention, it is to be understood that the invention is not limited to these precise products and processes, and that changes may be made therein without departing from the scope of the invention.

What is claimed is:

1. A composition of matter capable of forming a cross-linked three dimensional polymer product comprising (1) an elastometic copolymer, said copolymer being the reaction product of a first monomer selected from the group consisting of butadiene and butadiene derivatives and a second monomer selected from the group consisting of acrylonitrile and acrylonitrile derivatives, (2) a saturated halogenated polymer, (3) a poly-functional monomeric crosslinking agent, said crosslinking agent being a poly-functional monomeric salt derived from the reaction of an unsaturated tertiary amine with a compound selected from the group consisting of unsaturated mono-, di- and polycarboxylic acids and amino esters of said acids and (4) a photoinitiator, said photoinitiator being present in an amount sufficient to initiate crosslinking upon exposure to radiation.

2. The composition of claim 1 wherein said elastopolymer is a copolymer of butadiene and acrylonitrile.

3. The composition of claim 1 wherein said copolymer is a carboxylated acrylonitrile-butadiene copolymer.

4. The composition of claim 1 wherein said halogenated polymer is selected from the group consisting of homopolymers of vinyl chloride and copolymers of vinyl chloride and vinyl acetate.

5. The composition of claim 1 further including a thermosetting resin hardening agent.

6. The composition of claim 1 further including a bi-functional monomeric crosslinking agent, said crosslinking agent being the reaction product of a diisocyanate and a compound having a reactive hydroxy group.

7. The composition of claim 6 wherein said record crosslinking agent is tolylene 2,4-di (2 methacryloyl) ethyl carbamate.

8. The composition of claim 1 further including an organic solvent, for said polymers and crosslinking agent.

9. A process for forming a crosslinked three dimensional polymer product comprising the steps of providing a crosslinkable polymer mixture transparent to radiation, said mixture comprising (1) an elastomeric copolymer, said copolymer being the reaction product of a first monomer selected from the group consisting of butadiene and butadiene derivatives and a second monomer selected from the group consisting of acrylonitrile and acrylonitrile derivatives, (2) a saturated halogenated polymer, (3) a poly-functional monomeric crosslinking agent, said crosslinking agent being a poly-functional monomeric salt derived from the reaction of an unsaturated tertiary amine with a compound selected from the group consisting of unsaturated mono-, di- and polycarboxylic acids and amino esters of said acids, and (4) a crosslinking photoinitiator, said photoinitiator being sensitive to radiation of a predetermined type and being present in an amount sufficient to initiate crosslinking between said elastomeric copolymer, said halogenated polymer and said crosslinking agent upon exposure of said mixture to radiation of said predetermined type, and exposing at least a portion of said mixture to said radiation for a period of time sufficient to effect crosslinking of at least some of the non-terminal ethylenic groups in the portion of said mixture exposed to said radiation.

10. The process of claim 9 wherein said polymer mixture is deposited on a base as a film, said film having an essentially uniform cross-sectional thickness in the range of 1 to 350 mils, said exposing step including exposing only selected portions of said film to effect crosslinking of the entire cross-sectional portion thereof exposed to said radiation, and removing the non-exposed portion of said film subsequent to radiation to form a relief image.

11. The process of claim 9 wherein said exposing step includes irradiating said film with ultraviolet light through an image bearing transparency, said transparency having opaque and transparent areas.

12. The process of claim 9 wherein said photoinitiator is a thioketone and said radiation is electron radiation.

13. The process of claim 9 including the step of depositing a plurality of film layers of said polymer mixture on a base prior to said exposing step, said photoinitiator being present in each of said layers and in different amounts in at least some of said layers.

14. The process of claim 13 wherein said layers closest to said base contain the greatest amount of said photoinitiator.

15. The process of claim 12 wherein said elastopolymer is a copolymer of butadiene and acrylonitrile.

16. The process of claim 12 wherein said halogenated polymer is selected from the group consisting of homopolymers of vinyl chloride and copolymers of vinyl chloride and vinyl acetate.

17. The process of claim 10 wherein said removing step comprises treating said film with a solvent, said solvent selectively dissolving the non-exposed portions of said film.

18. The process of claim 10 including the step of subjecting the exposed portions of said film to a hardening treatment subsequent to the removal of the non-exposed portions of said film.

19. The process of claim 17 wherein said exposed portions of said film are re-exposed to radiation subsequent to said removal step.

20. A radiation sensitive member for the preparation of relief images comprising a base member and a radiation transparent film of a polymer mixture deposited thereon, said polymer mixture comprising (1) an elastomeric copolymer, said copolymer being the reaction product of a first monomer selected from the group consisting of butadiene and butadiene derivatives and a second monomer selected from the group consisting of acrylonitrile and acrylonitrile derivates, (2) a saturated halogenated polymer, (3) a poly-functional monomeric crosslinking agent, said crosslinking agent being a poly-functional monomeric salt derived from the reaction of an unsaturated tertiary amine with a compound selected from the group consisting of mono, di- and polycarboxylic acids and amino esters of said acids and (4) a radiation sensitive photoinitiator, said photoinitator being present in an amount sufficient to crosslink said elastopolymer, said halogenated polymer and said crosslinking agent upon exposure of said polymer mixture to radiation.

21. The radiation sensitive member of claim 20 wherein said halogenated polymer is selected from the group consisting of homopolymers of vinyl chloride and copolymers of vinyl chloride and vinyl acetate.

22. The radiation sensitive member of claim 20 wherein said elastopolymer is a copolymer of butadiene and acrylonitrile.

23. The radiation sensitive member of claim 20 further including a thermosetting resin hardening agent.

24. The radiation sensitive member of claim 20 further including a bifunctional monomeric crosslinking agent, said crosslinking agent being the reaction product of a diisocyanate and a compound having a reactive hyrdoxy group.

25. The radiation sensitive member of claim 20 wherein said transparent film is a composite film comprising separate film layers, said photoinitiator being present in each of said layers and in different amounts in at least some of said layers.

26. The radiation sensitive member of claim 20 wherein said transparent film is a composite film comprising sets of separate film layers, the amount of said photoinitiator in each set of layers being different, the layers closest to said base having the greatest amount of said photoinitiator.

References Cited

UNITED STATES PATENTS

| | | | |
|---|---|---|---|
| 2,964,401 | 12/1960 | Plambeck | 96—115 R |
| 3,558,322 | 1/1971 | Fan | 96—115 P |
| 3,330,659 | 7/1967 | Wainer | 96—35.1 |
| 3,544,790 | 12/1970 | Brown | 96—35.1 |
| 3,423,262 | 1/1969 | Barditch et al. | 96—115 R |
| 3,520,683 | 7/1970 | Kerwin | 96—35.1 |

FOREIGN PATENTS

| | | | |
|---|---|---|---|
| 614,181 | 2/1961 | Canada | 96—115 |

RONALD H. SMITH, Primary Examiner

U.S. Cl. X.R.

96—115 R, 115 P; 204—159.15